United States Patent
Abeygunawardana et al.

(10) Patent No.: US 11,920,848 B2
(45) Date of Patent: Mar. 5, 2024

(54) SENSOR ASSEMBLY FOR DETECTING ICE LEVEL IN A WATER JACKET COOLED ICE STORAGE CHAMBER

(71) Applicant: Haier US Appliance Solutions, Inc., Wilmington, DE (US)

(72) Inventors: Danister Abeygunawardana, Jeffersonville, IN (US); Brent Alden Junge, Evansville, IN (US); Jordan Andrew Waymeyer, Louisville, KY (US); Gregory Scott Carr, Louisville, KY (US); Timothy Ray Jackson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/505,702

(22) Filed: Oct. 20, 2021

(65) Prior Publication Data
US 2023/0123955 A1    Apr. 20, 2023

(51) Int. Cl.
*F25C 5/187* (2018.01)
*G01F 23/24* (2006.01)

(52) U.S. Cl.
CPC ............ *F25C 5/187* (2013.01); *G01F 23/248* (2013.01); *F25C 2600/04* (2013.01)

(58) Field of Classification Search
CPC .............................. F25C 5/187; G01F 23/248
See application file for complete search history.

(56) References Cited

U.S. PATENT DOCUMENTS

| | | | | |
|---|---|---|---|---|
| 2,672,493 A * | 3/1954 | Tingle | ............... | G01K 1/125 |
| | | | | 174/105 R |
| 2,799,144 A * | 7/1957 | Barton | ............... | F25C 1/04 |
| | | | | 62/344 |
| 4,721,399 A * | 1/1988 | Grosskurth | ............ | F16C 17/24 |
| | | | | 384/129 |
| 5,131,234 A | 7/1992 | Furukawa | | |
| 6,006,531 A * | 12/1999 | Pritts | ............... | F25D 17/045 |
| | | | | 236/DIG. 19 |
| 2008/0092567 A1* | 4/2008 | Doberstein | ............ | F25C 5/187 |
| | | | | 62/137 |
| 2012/0324913 A1* | 12/2012 | Bortoletto | ............... | F25C 5/18 |
| | | | | 62/344 |

FOREIGN PATENT DOCUMENTS

| | | | | |
|---|---|---|---|---|
| JP | 2006177600 A | * | 7/2006 | |
| JP | 4073242 B2 | | 4/2008 | |
| JP | 6200257 B2 | | 9/2017 | |
| KR | 2013091159 A | * | 8/2013 | |
| SU | 1463210 A1 | | 3/1989 | |

OTHER PUBLICATIONS

Translated_Nishiyama (Year: 2006).*
Translated_Soon (Year: 2013).*

* cited by examiner

*Primary Examiner* — Elizabeth J Martin
*Assistant Examiner* — Samba Gaye
(74) *Attorney, Agent, or Firm* — Dority & Manning, P.A.

(57) ABSTRACT

An icemaking appliance includes an ice storage chamber and a water jacket at least partially surrounding the ice storage chamber. A sensor assembly includes a sleeve, a conductive plug inserted into a first portion of the sleeve, and a temperature sensor inserted into a second portion of the sleeve. The first portion of the sleeve and the conductive plug are at least partially disposed within the ice storage chamber.

19 Claims, 5 Drawing Sheets

SENSOR ASSEMBLY FOR DETECTING ICE LEVEL IN A WATER JACKET COOLED ICE STORAGE CHAMBER

FIELD OF THE INVENTION

The present subject matter relates generally to icemaking appliances, and more particularly to sensors for determining a level of ice within the icemaking appliance.

BACKGROUND OF THE INVENTION

Icemaking appliances are appliances capable of forming and storing ice cubes for various consumer usages. Certain icemaking appliances are stand-alone, or countertop, appliances. These icemaking appliances may function alone to produce ice or ice cubes in a wide variety of styles and/or sizes. Further, some stand-alone icemaking appliances also incorporate a water or drink dispenser. These appliances may be capable of delivering water to a consumer from a municipal source or from a storage tank incorporated within the appliances. The water (or liquid) may be cooled by the stored ice cubes before being dispensed. For instance, the liquid may first run through a water jacket surrounding an ice storage container within the appliance.

Such appliances also incorporate a method or means for determining when the ice storage container is filled with ice. For instance, when an automatic icemaking program is in effect and automatically producing ice, a trigger is required to alert to icemaker to cease production of the ice when the container is filled to avoid overfilling and potentially damaging the appliance. In some examples, sensors are incorporated into, for example, a wall of the ice storage container. However, there are certain drawbacks to existing detection methods. For example, with the existence of a water jacket, a temperature detector may be subject to false readings as influenced by the water within the water jacket. Moreover, maintenance of the temperature detector within a wall of the container (and thus potentially through the water jacket) is difficult and prone to water leakage and damage.

Accordingly, an icemaking appliance that obviates one or more of the above-mentioned drawbacks would be beneficial. In particular, a temperature sensing assembly with one or more features for accurately sensing an ice level within an ice bucket would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an icemaking appliance is provided. The icemaking appliance may include a cabinet defining an ice storage chamber; an ice maker provided above the ice storage chamber and configured to form ice cubes; a water jacket at least partially surrounding the ice storage chamber; and a sensor assembly having at least a portion thereof disposed within the ice storage chamber. The sensor assembly may include a sleeve passing above the water jacket, the sleeve defining a first portion and a second portion, the first portion being arranged within the ice storage chamber; and a temperature sensor inserted into the second portion of the sleeve, wherein the temperature sensor is configured to detect a temperature change within an interior of the ice storage chamber.

In another exemplary aspect of the present disclosure, a temperature sensing assembly for an ice storage chamber is provided. The temperature sensing assembly may include a sleeve defining a first portion and a second portion; a conductive plug inserted into the first portion of the sleeve; and a thermistor inserted into the second portion of the sleeve, wherein the thermistor contacts the conductive plug at a junction of the first portion and the second portion, the conductive plug transferring heat between an interior of the ice storage chamber and the thermistor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
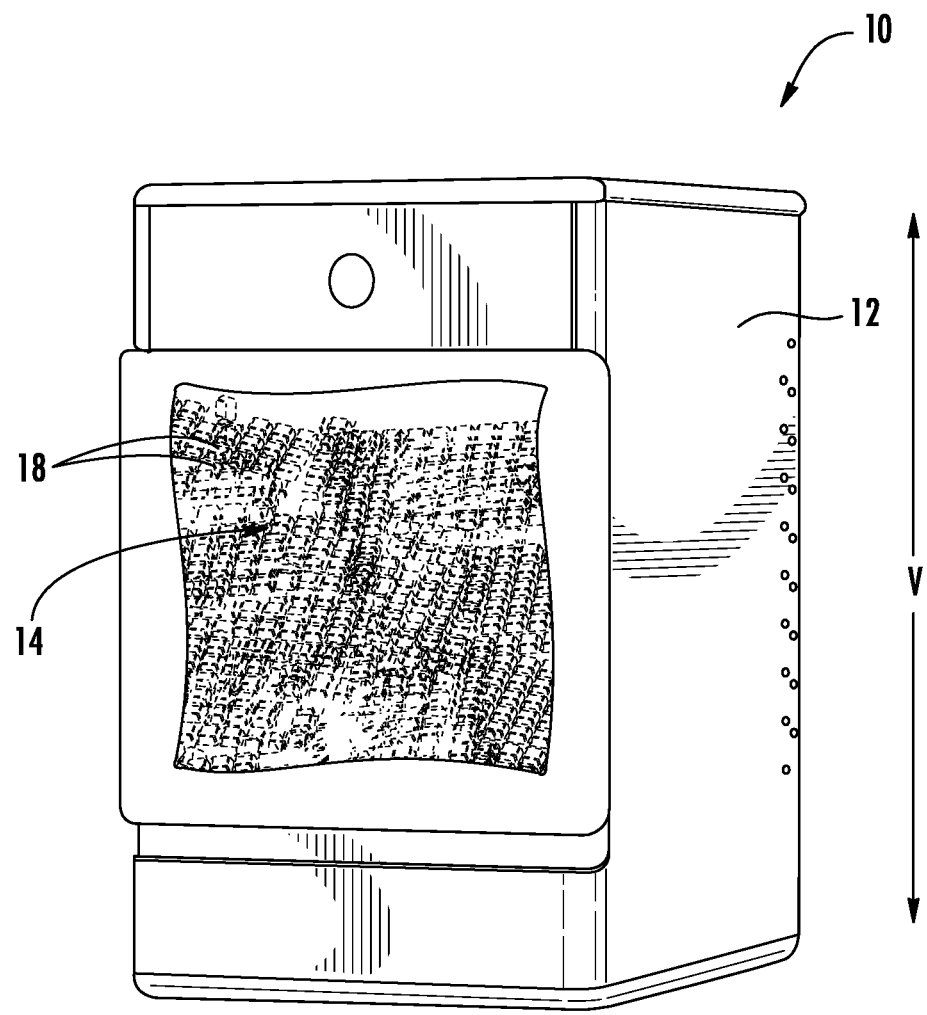
FIG. 1 provides a perspective view of a stand-alone beverage appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, one embodiment of a stand-alone ice making appliance 10 in accordance with the present disclosure is illustrated. As shown, appliance 10 includes an outer casing 12 which generally at least partially houses various other components of the appliance therein 10. A container 14 is also illustrated. Container 14 defines a first storage volume 16 for the receipt and storage of ice 18 therein. Accordingly, first storage volume 16 may be referred to as an ice storage container or ice storage chamber. A user of the appliance 10 may access ice 18 within the container 14 for consumption or other uses. Container 14 may include one or more sidewalls 20 and a base wall 22 (see FIG. 2), which may together define the first storage volume 16. In exemplary embodiments, at least one sidewall 20 may be formed from a clear, see-through (i.e., transparent or translucent) material, such as a clear glass or plastic, such that a user can see into the first storage volume 16 and thus view ice 18 therein. Further, in exemplary embodiments, container 14 may be removable, such as from the outer casing 12, by a user. This facilitates easy access by the user to ice within the container 14 and further, for example, may provide access to a water tank 24 (see FIG. 2) of the appliance 10.

Appliances 10 in accordance with the present disclosure may be stand-alone appliances, and thus may not be connected to refrigerators or other appliances. Additionally or alternatively, in exemplary embodiments, such appliances may or may not be connected to plumbing or another water source that is external to the appliance 10, such as a refrigerator water source. In some exemplary embodiments, water may be supplied to the appliance 10 manually by a user, such as by pouring water into water tank 24.

Notably, appliances 10 as discussed herein may include various features which allow the appliance 10 to be affordable and desirable to typical consumers. For example, the stand-alone feature may reduce the cost associated with the appliance 10 and allow the consumer to position the appliance 10 at any suitable desired location. In some embodiments, the only requirement for operation of ice making appliance 10 may be access to an electrical source. The container 14, which may be fixed to or removable from the appliance 10, allows easy access to ice and allows the container 14 to be moved to a different position from the remainder of the appliance 10 for ice usage purposes. Additionally, in exemplary embodiments as discussed herein, appliance 10 is configured to make nugget ice (as discussed herein) which is becoming increasingly popular with consumers.

Figure 2:
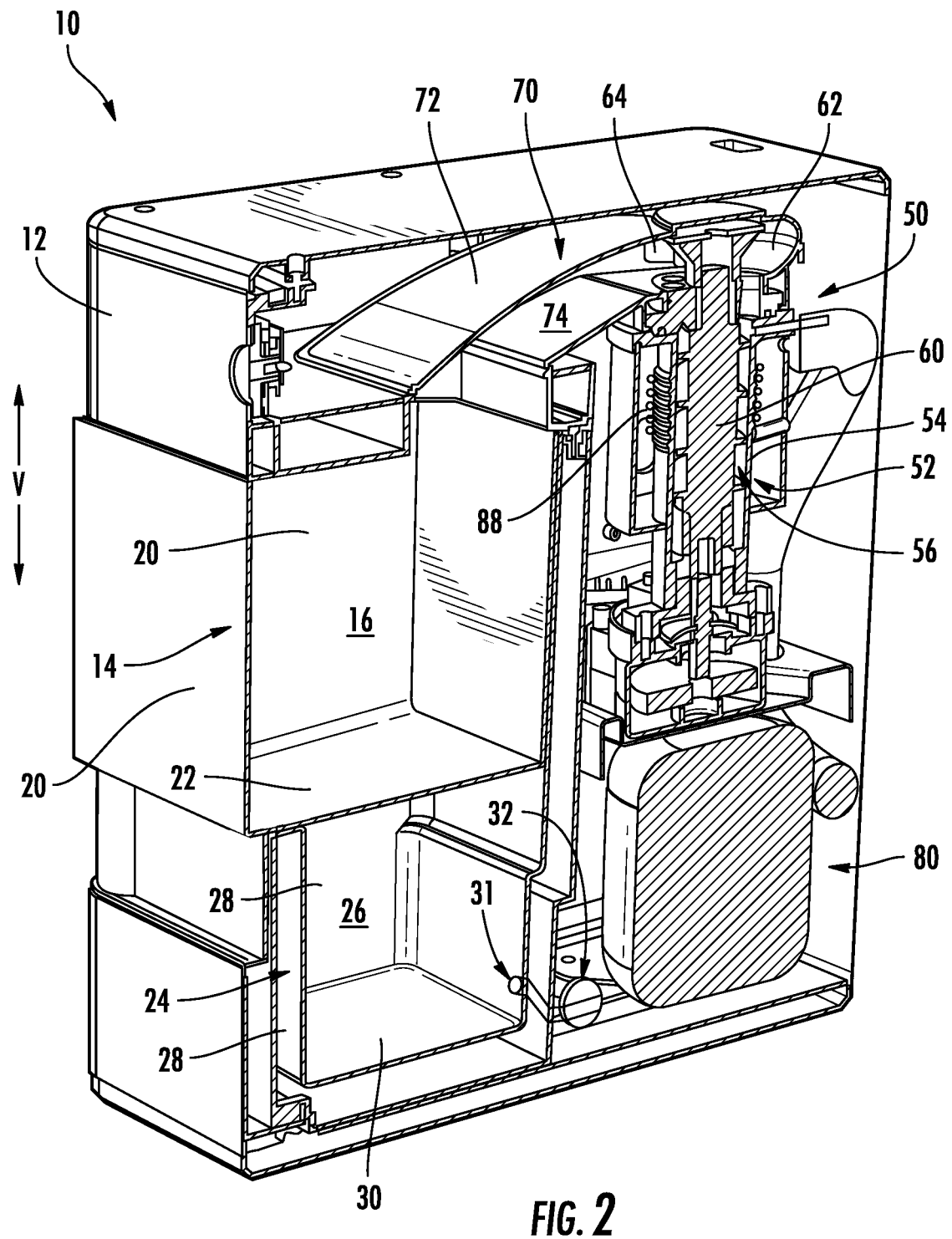
FIG. 2 provides a perspective sectional view of a stand-alone beverage appliance according to exemplary embodiments of the present disclosure.

Referring to FIG. 2, various other components of appliances 10 in accordance with the present disclosure are illustrated. For example, as mentioned, appliance 10 may include a water tank 24. The water tank 24 may define a second storage volume 26 for the receipt and holding of water. Water tank 24 may include one or more sidewalls 28 and a base wall 30 which may together define the second storage volume 26. In exemplary embodiments, the water tank 24 may be disposed below the container 14 along a vertical direction V defined for the appliance 10, as shown. In some exemplary embodiments, water tank 24 may receive and store melt water from ice 18 that has melted while in container 14. As will be described in more detail below, water tank 24 (or second storage volume 26) may be provided at least partially around container 14 (e.g., as a water jacket).

As discussed, in exemplary embodiments, water may be provided to the water tank 24 for use in forming ice. Accordingly, appliance 10 may further include a pump 32. Pump 32 may be in fluid communication with the second storage volume 26. For example, water may be flowable from the second storage volume 26 through an opening 31 defined in the water tank 24, such as in a sidewall 28 thereof, and may flow through a conduit to and through pump 32. Pump 32 may, when activated, actively flow water from the second storage volume 26 therethrough and from the pump 32.

Water actively flowed from the pump 32 may be flowed (for example through a suitable conduit) to a reservoir. For example, the reservoir may define a third storage volume, which may be defined by one or more sidewalls and a base wall. The third storage volume may, for example, be in fluid communication with the pump 32 and may thus receive water that is actively flowed from the water tank 24, such as through the pump 32. For example, water may be flowed into the third storage volume through an opening defined in the reservoir.

The reservoir and third storage volume thereof may receive and contain water to be provided to an ice maker 50 for the production of ice. Accordingly, the third storage volume may be in fluid communication with ice maker 50. For example, water may be flowed, such as through an opening and through suitable conduits, from the third storage volume to ice maker 50. A filter may be provided in fluid communication with the third storage volume and the ice maker 50. The filter may filter water as it is flowed from the third storage volume to the ice maker 50.

Ice maker 50 generally receives water, such as from the reservoir, and freezes the water to form ice 18. While any suitable style of ice maker is within the scope and spirit of the present disclosure, in exemplary embodiments, ice maker 50 is a nugget ice maker, and in particular is an auger-style ice maker. As shown, ice maker 50 may include a casing 52 into which water from the third storage volume is flowed. Casing 52 is thus in fluid communication with the third storage volume. For example, casing 52 may include one or more sidewalls 54 which may define an interior volume 56, and an opening may be defined in a sidewall 54. Water may be flowed from the third storage volume through the opening (such as via a suitable conduit) into the interior volume 56.

As illustrated, an auger 60 may be disposed at least partially within the casing 52. During operation, the auger 60 may rotate. Water within the casing 52 may at least partially freeze due to heat exchange, such as with a refrigeration system as discussed herein. The at least partially frozen water may be lifted by the auger 60 from casing 52. Further, in exemplary embodiments, the at least partially frozen water may be directed by auger 60 to and through an extruder 62. The extruder 62 may extrude the at least partially frozen water to form ice, such as nuggets of ice 18.

Formed ice 18 may be provided by the ice maker 50 to container 14 and may be received in the first storage volume 16 thereof. For example, ice 18 formed by auger 60 and/or extruder 62 may be provide to the container 14. In exemplary embodiments, appliance 10 may include a chute 70 for directing ice 18 produced by the ice maker 50 towards the first storage volume 16. For example, as shown, chute 70 is generally positioned above container 14 along the vertical direction V. Thus, ice can slide off of chute 70 and drop into storage volume 16 of container 14. Chute 70 may, as shown, extend between ice maker 50 and container 14, and may include a body 72 which defines a passage 74 therethrough. Ice 18 may be directed from the ice maker 50 (such as from the auger 60 and/or extruder 62) through the passage 74 to the container 14. In some embodiments, for example, a sweep 64, which may for example be connected to and rotate with the auger, may contact the ice emerging through the extruder 62 from the auger 60 and direct the ice through the passage 74 to the container 14.

As discussed, water within the casing 52 may at least partially freeze due to heat exchange, such as with a refrigeration system. In exemplary embodiments, ice maker 50 may include a sealed refrigeration system 80. The sealed refrigeration system 80 may be in thermal communication with the casing 52 to remove heat from the casing 52 and interior volume 56 thereof, thus facilitating freezing of water therein to form ice. Sealed refrigeration system 80 may, for example, include a compressor, a condenser, a throttling device, and an evaporator 88. Evaporator 88 may, for example, be in thermal communication with the casing 52 in order to remove heat from the interior volume 56 and water therein during operation of sealed system 80. For example, evaporator 88 may at least partially surround the casing 52. In particular, evaporator 88 may be a conduit coiled around and in contact with casing 52, such as the sidewall(s) 54 thereof. During operation of sealed system 80, refrigerant exits evaporator 88 as a fluid in the form of a superheated vapor and/or vapor mixture. Upon exiting evaporator 88, the refrigerant enters the compressor wherein the pressure and temperature of the refrigerant are increased such that the refrigerant becomes a superheated vapor. The superheated vapor from the compressor enters the condenser wherein energy is transferred therefrom and condenses into a saturated liquid and/or liquid vapor mixture. This fluid exits the condenser and travels through the throttling device that is configured for regulating a flow rate of refrigerant therethrough. Upon exiting the throttling device, the pressure and temperature of the refrigerant drop at which time the refrigerant enters evaporator 88 and the cycle repeats itself. In certain embodiments, the throttling device may be a capillary tube. Notably, in some embodiments, sealed system 80 may additionally include fans for facilitating heat transfer to/from the condenser and evaporator 88.

As discussed, in exemplary embodiments, ice 18 may be nugget ice. Nugget ice is ice that is maintained or stored (i.e., in first storage volume 16 of container 14) at a temperature greater than the melting point of water or greater than about thirty-two degrees Fahrenheit. Accordingly, the ambient temperature of the environment surrounding the container 14 may be at a temperature greater than the melting point of water or greater than about thirty-two degrees Fahrenheit. In some embodiments, such temperature may be greater than forty degrees Fahrenheit.

Ice 18 held within the first storage volume 16 may gradually melt. The melting speed is increased for nugget ice due to the increased maintenance/storage temperature. Accordingly, drain features may advantageously be provided in the container for draining such melt water. Additionally, and advantageously, the melt water may in exemplary embodiments be reused by appliance 10 to form ice.

Figure 3:
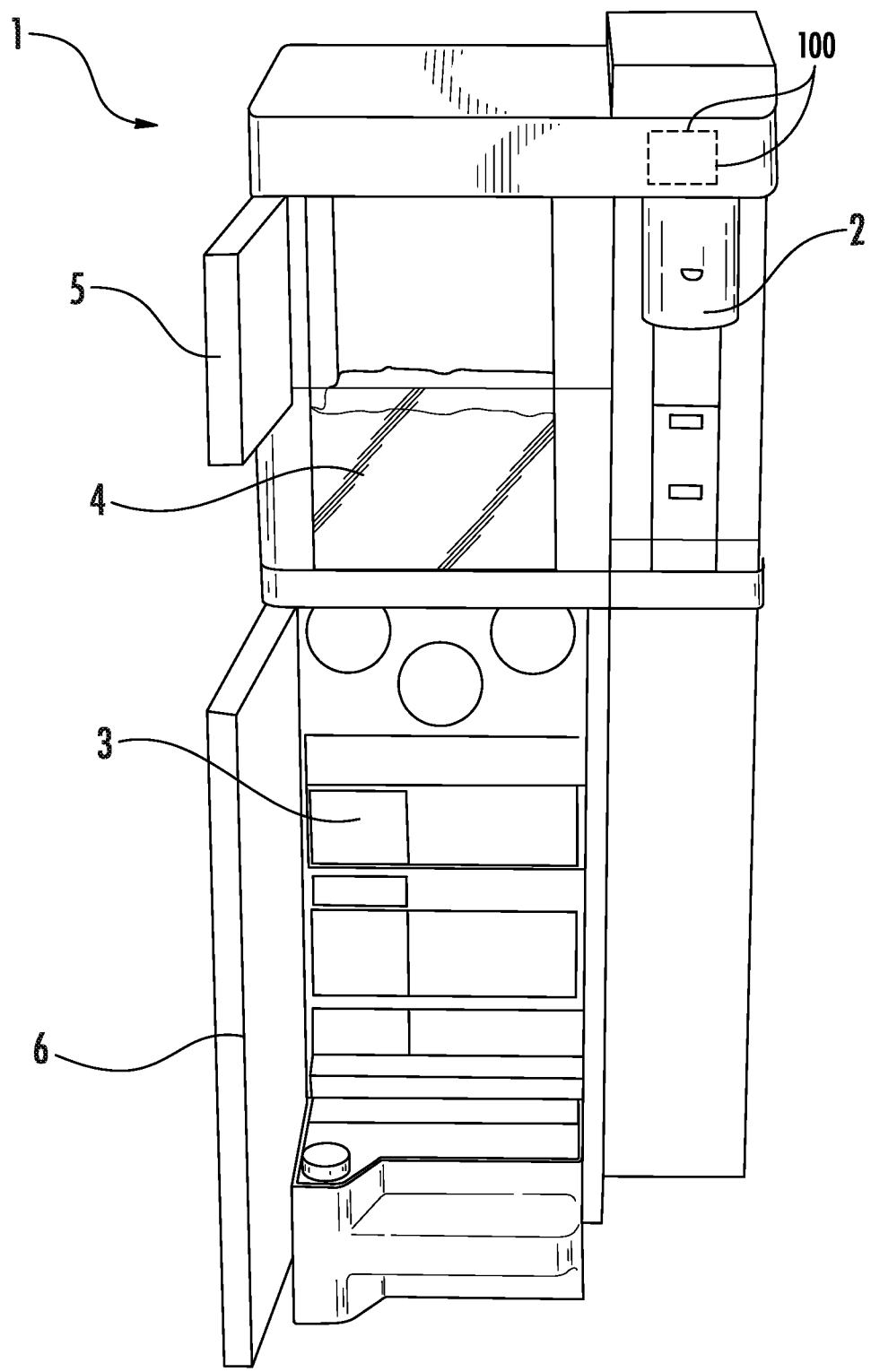
FIG. 3 provides a perspective view of a beverage dispenser according to exemplary embodiments of the present disclosure.

FIG. 3 illustrates an example of a beverage dispenser 1 which incorporates an ice making appliance (e.g., stand-alone ice making appliance 10) and a beverage cooling system described hereinafter. Beverage dispenser 1 may include an ice making appliance (e.g., stand-alone ice making appliance 10), a dispenser nozzle 2, a beverage container compartment 3, ice container 4 (e.g., container 14), and a beverage cooling system. The beverage container compartment 3 may be configured to accommodate a container (e.g., a bottle or canister) containing a beverage (e.g., water or juice) that a user wishes to cool and dispense through the dispenser nozzle 2. The beverage container compartment 3 may be located below the ice container 4 (e.g., container 14) and may include a door 6 through which a user may access the beverage container compartment 3. The ice container 4 may include a door 5 which may be opened and closed to allow access to the ice container 4. Accordingly, a single unit may be used to produce ice, store ice, quick cool a beverage, and dispense the beverage to a user.

A sensor assembly 200 will be described in detail with particular reference to FIGS. 4 through 7. Sensor assembly 200 may be configured for detecting an ice level within, for example, ice storage chamber 16. Sensor assembly 200 may detect changes in temperature within ice storage chamber 16 as a level of ice therein increases, therefore reaching sensor assembly 200. Thus, sensor assembly 200 may be provided at or near ice storage chamber 16 and may communicate with a controller 100 provided within appliance 10. As will be further described, sensor assembly 200 may avoid false reading presented by additional attributes of appliance 10.

As used herein, "temperature sensor" or the equivalent is intended to refer to any suitable type of temperature measuring system or device positioned at any suitable location for measuring the desired temperature. Thus, for example, the temperature sensor 218 (described below) may be any suitable type of temperature sensor, such as a thermistor, a thermocouple, a resistance temperature detector, a semiconductor-based integrated circuit temperature sensor, etc. In addition, temperature sensor 218 may be positioned at any suitable location and may output a signal, such as a voltage, to a controller that is proportional to and/or indicative of the temperature being measured. Although exemplary positioning of temperature sensors is described herein, it should be appreciated that appliance 10 may include any other suitable number, type, and position of temperature, humidity, and/or other sensors according to alternative embodiments.

Appliance 10 may include a water jacket 102. Water jacket 102 may at least partially surround ice storage chamber 16. Water jacket 102 may be a channel or pocket configured to store water or liquid therein. In detail, appliance 10 may include a beverage dispensing system together with ice maker 50. The beverage dispensing system may dispense the water or liquid stored within water jacket 102. Thus, water jacket 102 may transfer heat between the water or liquid stored therein and ice storage chamber 16 (or the ice 18 stored therein).

Figure 4:
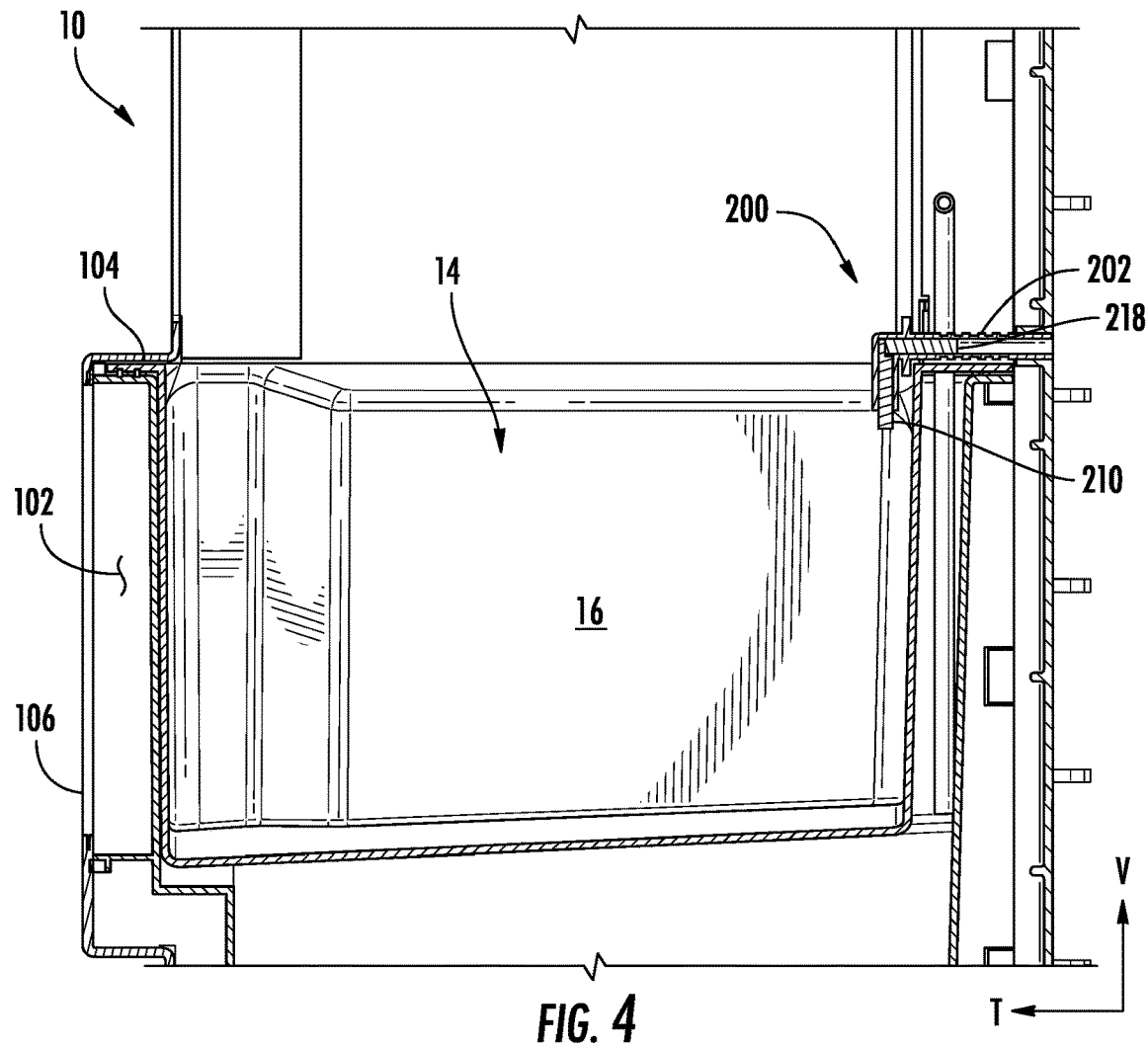
FIG. 4 provides a side section view of the stand-alone beverage appliance of FIG. 1, showing a sensor assembly.
Figure 6:
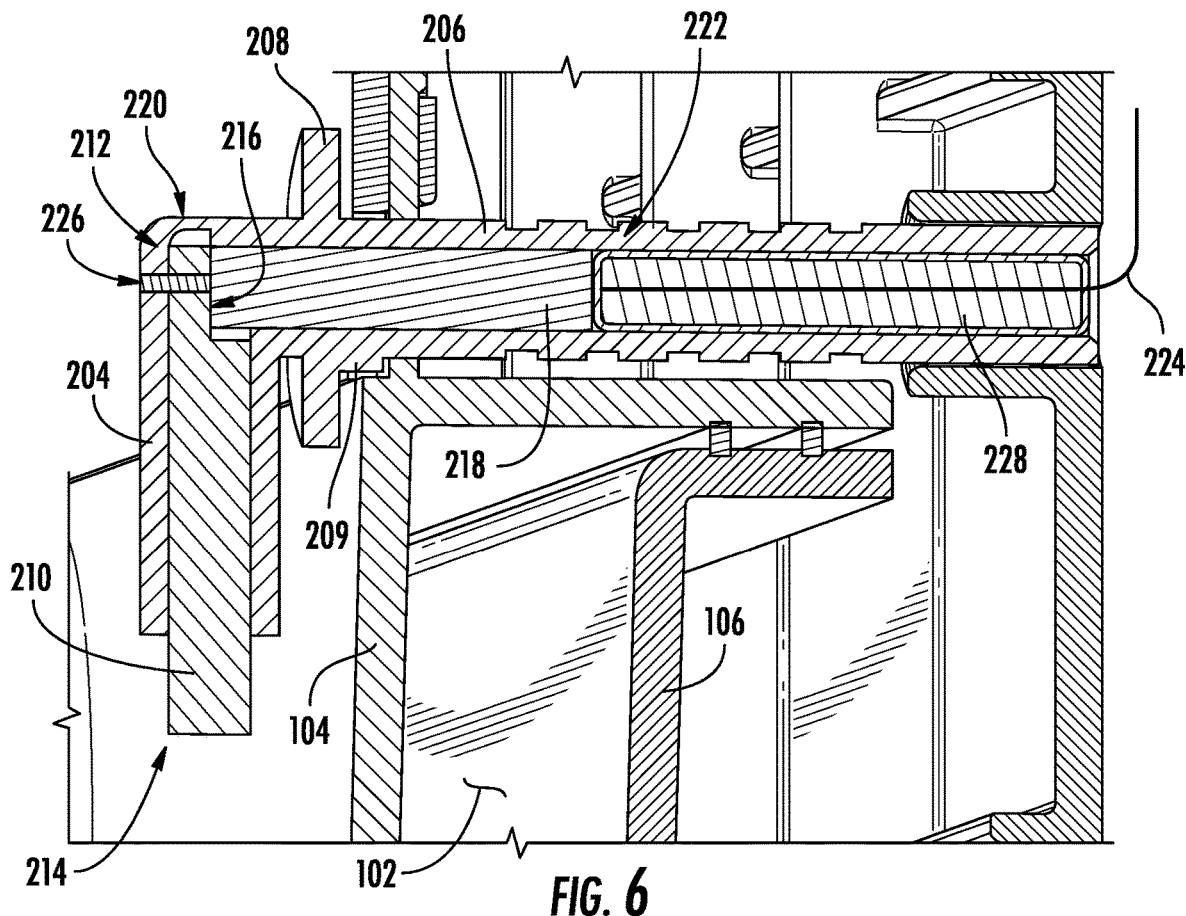
FIG. 6 provides a side section view of the sensor assembly of FIG. 4.

As shown in FIGS. 4 and 6, ice storage chamber 16 may include a first bin (or inner bin) 104 and a second bin (or outer bin) 106. The ice 18 may be stored within first bin 104. Thus, first bin 104 may be nested within second bin 106. A space between first bin 104 and second bin 106 may be referred to as the water jacket 102. In detail, the water or liquid may completely fill water jacket 102. In other embodiments, however, a serpentine piping system runs through the space between first bin 104 and second bin 106. Additionally or alternatively, one or more forms of insulation may be present within water jacket 102 (e.g., surrounding the serpentine piping system).

Since water jacket 102 at least partially surrounds ice storage chamber 16 (e.g., first bin 104), the water or liquid stored within water jacket 102 may inadvertently provide false temperature readings to sensor assembly 200. Thus, a location and design of sensor assembly 200 may be imperative to ensure accurate readings. As seen in FIG. 4, sensor assembly 200 may be provided at least partially above water jacket 102 (e.g., along the vertical direction V).

In detail, sensor assembly 200 may include a sleeve 202. Sleeve 202 may be made from a plastic, for instance, and may selectively hold a temperature sensor (described below) to detect a temperature within ice storage compartment 16. It should be understood that sleeve 202 may be made from any suitable material. In some embodiments, sleeve 202 includes an insulation therein. Accordingly, sleeve 202 may restrict inadvertent temperature readings from undesirable sources (e.g., water jacket 102). Further, sleeve 202 may be tubular shaped (i.e., sleeve 202 may have a circular cross-section). However, sleeve 202 may have any suitable cross-section such that the temperature sensor may be accommodated therein.

Sleeve 202 may include a first portion 204 and a second portion 206. According to at least some embodiments, first portion 204 and second portion 206 are perpendicular to each other. For instance, a junction between first portion 204 and second portion 206 may form a right angle. Accordingly, first portion 204 may be vertically oriented. In detail, first portion 204 may extend along the vertical direction V (e.g., when sleeve is in an installed position within appliance 10). Second portion 206 may be horizontally oriented. In detail, second portion 206 may extend along the transverse direction T (or lateral direction L). Thus, sleeve 202 may have an "L" shape. It should be understood that sleeve 202 may have any appropriate shape, including any varying degrees of angle between first portion 204 and second portion 206.

Figure 7:
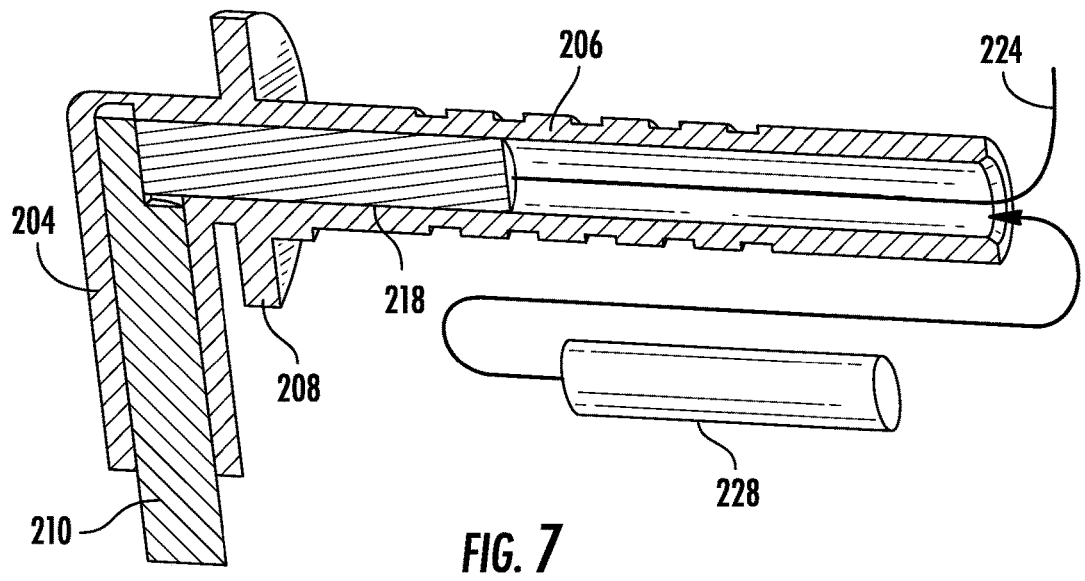
FIG. 7 provides a perspective cut away view of the sensor assembly of FIG. 4.

Sleeve 202 may further include a flange 208. Flange 208 may be provided around second portion 206 (e.g., circumferentially around second portion 206). Flange 208 may be provided near the junction between first portion 204 and second portion 206. As seen in FIG. 7, a gap may be formed between flange 208 and first portion 204. Accordingly, when sleeve 202 is installed within appliance 10, flange 208 may assure a proper location and placement of sleeve 202. As described above, sensor assembly 200 (and thus sleeve 202) may be installed within appliance 10 to detect temperatures within ice storage compartment 16 and transmit the detected temperature to controller 100, where controller 100 determines an amount of ice within ice storage compartment 16. Therefore, sleeve 202 may be inserted into a receiving hole within a wall (e.g., an interior wall adjacent ice storage compartment 16) from an interior of appliance 10. Flange 208 may abut the interior installation wall when sleeve is fully inserted.

Figure 5:
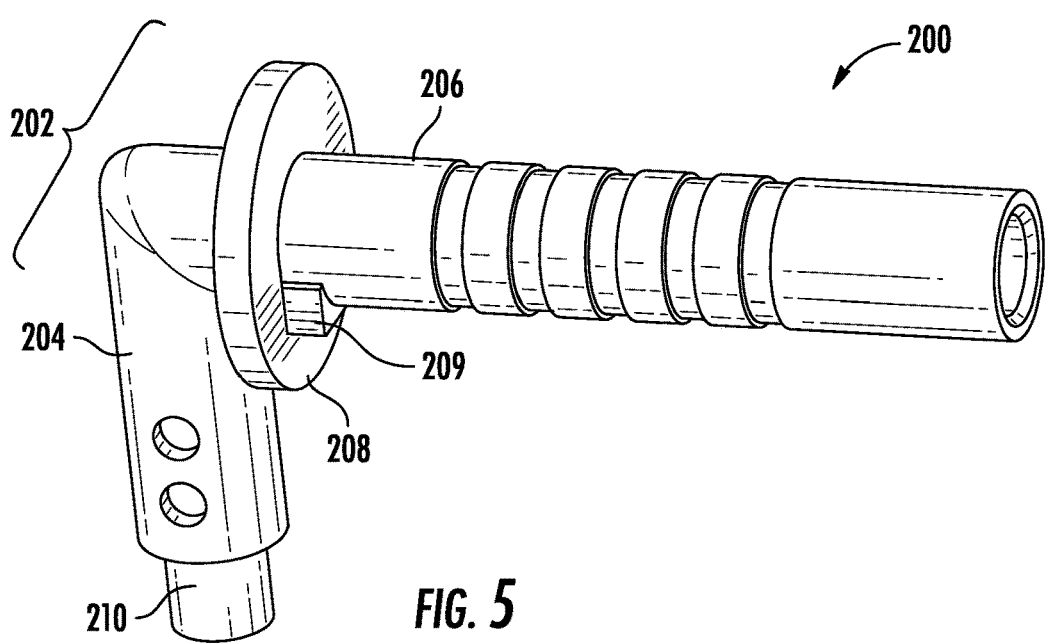
FIG. 5 provides a perspective view of the sensor assembly of FIG. 4.

Additionally or alternatively, as described briefly above, sensor assembly 200 may be at least partially provided above water jacket 102. However, at least a portion of flange 208 may contact ice storage compartment 16 (e.g., first bin 104). Sleeve 202 may include a tab 209 protruding parallel to second portion 206 from flange 208. As best shown in FIG. 5, tab 209 may protrude along the transverse direction T (or an axial direction with respect to second portion 206) from flange 208. Additionally or alternatively, tab 209 may protrude downward along the vertical direction V from second portion 206. A bottom surface of tab 209 may be flat (e.g., parallel to a top surface of first bin 104). Accordingly, when sleeve 202 is installed within appliance 10, tab 209 may engage with the top surface of first bin 104 to prevent a rotation of sleeve 202, e.g., about an axis of second portion 206.

Sensor assembly 200 may include a conductive plug 210. Conductive plug 210 may be inserted within first portion 204 of sleeve 202. For instance, conductive plug 210 may be fixed within first portion 204. Thus, when first portion 204 is oriented along the vertical direction V, conductive plug 210 may be secured within sleeve 202. Conductive plug 210 may be made from a conductive material having high heat transfer capabilities. In at least some examples, conductive plug 210 is a copper plug. Accordingly, conductive plug 210 may easily and quickly relay a temperature change (e.g., from ice storage compartment 16 to the temperature sensor).

Conductive plug 210 may define a first end 212 and a second end 214 opposite first end 212. First end 212 may be located within sleeve 202. In detail, first end 212 may be located at or near the junction between first portion 204 and second portion 206 of sleeve 202. Thus, as will be described in further detail below, first end 212 may be in contact (e.g., physical contact, thermal contact) with the temperature sensor. Second end 214 may protrude out of a distal end of first portion 204. As shown in FIG. 5, second end may protrude downward along the vertical direction V from first portion 204. Thus, when first portion 204 is provided above ice storage compartment 16, second end 214 may extend a predetermined distance into ice storage compartment 16. Accordingly, second end 214 may exchange heat with the contents of ice storage compartment 16 (e.g., ice cubes). The heat exchange effects may then be transmitted to the temperature sensor.

First end 212 of conductive plug 210 may include a notch 216 formed therein. As best shown in FIGS. 6 and 7, notch 216 may be a cut out from first end 212 of conductive plug 210. Notch 216 may face second portion 206 of sleeve 202, e.g., at the junction between first portion 204 and second portion 206. Notch 216 may form a flat surface that axially faces second portion 206.

Temperature sensor 218 may be positioned within second portion 206 of sleeve 202. For instance, the temperature sensor may be a thermistor 218. Thermistor 218 is described herein as one potential example, and as described above, one of ordinary skill would understand that any suitable temperature sensor may be incorporated. Thermistor 218 may be removably inserted within second portion 206. For instance, thermistor 218 may be inserted through a distal end of second portion 206 (e.g., opposite the junction of first portion 204 and second portion 206). Accordingly, thermistor 218 may be easily removed for maintenance or replacement without having to disassemble sensor assembly 200.

Thermistor 218 may include a first end 220 and a second end 222 opposite first end 220. First end 220 may contact conductive plug 210 (e.g., when thermistor 218 is in a fully inserted position, as shown in FIGS. 6 and 7). In detail, first end 220 may have a flat or relatively flat surface. The flat surface of first end 220 may be in planar contact with notch 216 of conductive plug 210. Advantageously, heat exchange may be increased between conductive plug 210 and thermistor 218. Thermistor 218 may have a wire 224 extending from second end 222. For instance, wire 224 may extend out of the distal end of second portion 206. Wire 224 may be operably coupled to controller 100, for example.

Sleeve 202 may have a pin hole 226 formed therein. As best seen in FIG. 6, pin hole 226 may be defined through first portion 204 of sleeve 202. In detail, pin hole 226 may be defined through a cylindrical or circumferential side of first portion 204 and extend into second portion 206. Pin hole 226 may also be defined through conductive plug 210. Thus, a user may insert a pin or other long, slender object through pin hole 226 to contact and push thermistor 218 toward the distal end of second portion 206.

Sensor assembly 200 may include a spacer 228. Spacer 228 may be removably inserted within second portion 206, e.g., after thermistor 218. As best shown in FIG. 6, spacer may press thermistor 218 up against conductive plug 210 (e.g., notch 216). Spacer 228 may be formed as a hollow tube, such that wire 224 is able to pass through spacer 228 (e.g., along an axial direction of spacer 228). Additionally or alternatively, spacer 228 may have an axially formed slit such that a cross-section of spacer 228 forms a "C" shape. Thus, spacer 228 may be resilient. For example, spacer 228 may be a torsion spring. Accordingly, spacer 228 may engage with an internal circumferential surface of second portion 206 to maintain thermistor 218 in contact with conductive plug 210.

As described herein, a sensor assembly is able to provide accurate readings of ice levels within an ice storage chamber while avoiding undue influence from other features of the ice maker. The ice maker may include a water jacket surrounding the ice storage chamber. The water jacket may include a serpentine tube carrying water or liquid to be cooled by the ice stored in the ice storage chamber. Additionally or alternatively, the water jacket may simply store a quantity of liquid therein. Accordingly, the liquid within the water jacket may produce an undesired effect on the temperature sensor or thermistor provided within the sensor assembly. Thus, the sensor assembly may be provided at least partially above the water jacket. The sensor assembly may include a sleeve having an "L" shape, with a first portion provided vertically within the ice storage chamber and a second portion provided horizontally above the water jacket. Accordingly, the thermistor may avoid damage due to water leakages from the water jacket. Moreover, the thermistor may determine accurate temperatures within the ice storage chamber not influenced by the temperature of the water jacket.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An icemaking appliance defining a vertical direction, a lateral direction, and a transverse direction, the icemaking appliance comprising:
    a cabinet defining an ice storage chamber;
    an ice maker provided above the ice storage chamber and configured to form ice cubes;
    a water jacket at least partially surrounding the ice storage chamber; and
    a sensor assembly having at least a portion thereof disposed within the ice storage chamber, the sensor assembly comprising:
    a sleeve passing above the water jacket, the sleeve defining a first portion and a second portion, the first portion being arranged within the ice storage chamber;
    a conductive plug inserted into the first portion of the sleeve; and
    a temperature sensor inserted into the second portion of the sleeve, the temperature sensor being a separate piece from the conductive plug, wherein the temperature sensor is configured to detect a temperature change within an interior of the ice storage chamber to determine a level of the ice cubes within the ice storage chamber when at least one ice cube contacts the conductive plug, and wherein the temperature sensor is in thermal contact with the conductive plug at a junction of the first portion and the second portion, the conductive plug transferring heat between the interior of the ice storage chamber and the temperature sensor.

2. The icemaking appliance of claim 1, wherein the first portion of the sleeve and the second portion of the sleeve are perpendicular to each other, the first portion extending along the vertical direction and the second portion extending along the transverse direction.

3. The icemaking appliance of claim 1, wherein the first portion of the sleeve extends a predetermined distance into the ice storage chamber along the vertical direction from a distal end of the second portion of the sleeve.

4. The icemaking appliance of claim 1, wherein the conductive plug is permanently fixed within the first portion of the sleeve.

5. The icemaking appliance of claim 1, wherein the conductive plug is made of copper.

6. The icemaking appliance of claim 1, further comprising:
    a spacer removably inserted within the second portion of the sleeve, wherein the temperature sensor defines a first end and a second end opposite the first end, the first end contacting the conductive plug and the second end contacting the spacer.

7. The icemaking appliance of claim 6, wherein the spacer is a hollow tube to allow a wire from the temperature sensor to be fed therethrough.

8. The icemaking appliance of claim 1, further comprising:
    an aperture formed through the first portion of the sleeve along the transverse direction, wherein the aperture extends into the second portion of the sleeve.

9. The icemaking appliance of claim 8, wherein the aperture is formed through the conductive plug to allow access to the second portion of the sleeve through the first portion of the sleeve and the conductive plug.

10. The icemaking appliance of claim 9, wherein the temperature sensor is a thermistor removably inserted within the second portion of the sleeve, the thermistor being operably coupled to a controller within the icemaking appliance.

11. A temperature sensing assembly for an ice storage chamber, the ice storage chamber defining a vertical direction, a lateral direction, and a transverse direction, the temperature sensing assembly comprising:
    a sleeve defining a first portion and a second portion;
    a conductive plug inserted into the first portion of the sleeve; and
    a thermistor inserted into the second portion of the sleeve to determine a level of the ice cubes within the ice storage chamber when at least one ice cube contacts the conductive plug, the temperature sensor being a separate piece from the conductive plug, wherein the thermistor contacts the conductive plug at a junction of the first portion and the second portion, the conductive plug transferring heat between an interior of the ice storage chamber and the thermistor.

12. The temperature sensing assembly of claim 11, wherein the first portion of the sleeve and the second portion of the sleeve are perpendicular to each other, the first portion extending along the vertical direction and the second portion extending along the transverse direction.

13. The temperature sensing assembly of claim 12, wherein the first portion of the sleeve extends a predetermined distance into the ice storage chamber along the vertical direction from a distal end of the second portion of the sleeve.

14. The temperature sensing assembly of claim 11, wherein the conductive plug is permanently fixed within the first portion of the sleeve.

15. The temperature sensing assembly of claim 11, wherein the conductive plug is made of copper.

16. The temperature sensing assembly of claim 11, further comprising:
   a spacer removably inserted within the second portion of the sleeve, wherein the thermistor defines a first end and a second end opposite the first end, the first end contacting the conductive plug and the second end contacting the spacer.

17. The temperature sensing assembly of claim 16, wherein the spacer is a hollow tube to allow a wire from the thermistor to be fed therethrough.

18. The temperature sensing assembly of claim 11, further comprising:
   an aperture formed through the first portion of the sleeve along the transverse direction, wherein the aperture extends into the second portion of the sleeve.

19. The temperature sensing assembly of claim 18, wherein the thermistor is removably inserted within the second portion of the sleeve, and wherein the aperture is formed through the conductive plug to allow access to the second portion of the sleeve through the first portion of the sleeve and the conductive plug.

\* \* \* \* \*